(12) United States Patent
Douche

(10) Patent No.: US 11,548,084 B2
(45) Date of Patent: Jan. 10, 2023

(54) METHOD AND DEVICE FOR CUTTING A PLATE OR PANEL OF POROUS CONSTRUCTION MATERIAL

(71) Applicant: SAINT-GOBAIN PLACO, Suresnes (FR)

(72) Inventor: Jean-Pierre Douche, Le Plessis Brion (FR)

(73) Assignee: SAINT-GOBAIN PLACO, Suresnes (FR)

(\*) Notice: Subject to any disclaimer, the term of this patent is extended or adjusted under 35 U.S.C. 154(b) by 1064 days.

(21) Appl. No.: 16/082,165

(22) PCT Filed: Mar. 15, 2017

(86) PCT No.: PCT/FR2017/050591
§ 371 (c)(1),
(2) Date: Sep. 4, 2018

(87) PCT Pub. No.: WO2017/158290
PCT Pub. Date: Sep. 21, 2017

(65) Prior Publication Data
US 2020/0047266 A1 Feb. 13, 2020

(30) Foreign Application Priority Data
Mar. 15, 2016 (FR) ...................................... 1652198

(51) Int. Cl.
*B23D 57/00* (2006.01)
(52) U.S. Cl.
CPC ..... *B23D 57/0046* (2013.01); *B23D 57/0053* (2013.01); *B23D 57/0061* (2013.01); *B23D 57/0069* (2013.01); *Y10T 83/9292* (2015.04)

(58) Field of Classification Search
CPC ............ B24B 27/0633; B23D 57/0007; B23D 57/0015; B23D 57/0023; B23D 57/003;
(Continued)

(56) References Cited

U.S. PATENT DOCUMENTS

| 4,016,856 | A | | 4/1977 | McLaughlin |
| 4,067,312 | A | \* | 1/1978 | Tessner .............. B23D 57/0061 125/21 |

(Continued)

FOREIGN PATENT DOCUMENTS

| EP | 2 529 888 A1 | 12/2012 |
| FR | 2 640 906 A1 | 6/1990 |

(Continued)

OTHER PUBLICATIONS

International Search Report dated May 31, 2017 in PCT/FR2017/050591 filed Mar. 15, 2017.

*Primary Examiner* — Clark F Dexter
(74) *Attorney, Agent, or Firm* — Oblon, McClelland, Maier & Neustadt, L.L.P.

(57) ABSTRACT

A device for cutting a plate or panel of porous construction material includes a movement structure that moves the plate or panel and includes at least one conveyor, and which is able to move in a direction (X). The device also includes a wire to cut the plate or panel and a structure for passing the wire in a direction (Y) perpendicular to the direction (X) of travel of the plate or panel. The device for cutting allows a cut to be made that greatly limits the waste and dust generated.

20 Claims, 2 Drawing Sheets

(58) Field of Classification Search
CPC ............ B23D 57/0038; B23D 57/0046; B23D 57/0053; B23D 57/0061; B23D 57/0069; B23D 61/185
See application file for complete search history.

(56) References Cited

U.S. PATENT DOCUMENTS

| | | | |
|---|---|---|---|
| 4,484,502 A | | 11/1984 | Ebner |
| 4,915,000 A | * | 4/1990 | MacFarlane ....... B23D 57/0007 125/21 |
| 8,118,075 B2 | * | 2/2012 | Sampica et al. .... B32B 17/1099 156/762 |
| 8,419,896 B2 | * | 4/2013 | Ciliberti et al. ...... G02F 1/1303 156/717 |
| 2009/0126713 A1 | * | 5/2009 | Grumbine et al. .... B28D 5/007 125/21 |
| 2010/0037880 A1 | * | 2/2010 | Kawasaki et al. ..... B28D 5/007 125/16.02 |
| 2013/0206126 A1 | * | 8/2013 | Pietsch ................ B28D 5/0076 125/21 |
| 2014/0103022 A1 | * | 4/2014 | Teck ........................ B26D 3/28 219/221 |
| 2015/0266117 A1 | | 9/2015 | Koma et al. |
| 2015/0314484 A1 | * | 11/2015 | Pietsch ................. B28D 5/045 125/21 |

FOREIGN PATENT DOCUMENTS

| | | | |
|---|---|---|---|
| JP | 9-29610 | * | 2/1997 |
| WO | WO 2008/015895 A1 | | 2/2008 |

* cited by examiner

METHOD AND DEVICE FOR CUTTING A PLATE OR PANEL OF POROUS CONSTRUCTION MATERIAL

The invention relates to a device and to a method for cutting a plate or panel of porous construction material. This plate or panel may be made of any porous construction material, for example based on fibers such as mineral wool or wool from biologically sourced materials, or a wool made up of different types of fibers. The panel may also be a pressed mineral fiber panel or alternatively a panel based on biologically sourced materials, such as wood or other natural fibers, or based on polymer fibers, or based on a mixture of different types of fibers, etc.

These porous construction materials may be produced by on-line processes in which a mixture is prepared via a dry route or a liquid route, in particular as an airborne suspension of fibers, this mixture containing a binding agent, and the mixture is deposited or spread on a conveyor member and subjected to operations of setting or curing the binding agent. Finally, a solid material is obtained which is cut to the desired dimensions to fashion an end-finished product, where appropriate prior to later transformation steps. A first cut is made on-line in order to separate individual elements, and one or more cutting operations may be performed as rework operations in shaping workshops.

There are, in the on-line methods, cutting devices such as guillotine saws, bandsaws, circular saws, or even milling cutters or routers. However, these cutting devices also have the disadvantage of generating a great deal of dust, which is potentially hazardous to the operators. In addition, these cutting devices generally have sawteeth which are offset in the thickness, something which may generate significant amounts of waste and spoilage of the material.

There are also high-pressure waterjet devices which, although they admittedly limit the amount of dust, have the disadvantage of supplying a significant quantity of water to the cutting surfaces, which water may be absorbed by the porous material and compromise the properties, including the mechanical properties, of the material at the expense the quality of the final build.

There is therefore a need for a device for cutting plates or panels, which allows a cut to be made in a porous construction material that greatly limits the waste and dust generated.

For that, the invention proposes a device for cutting a plate or panel of porous construction material, comprising:
  movement means that move the plate or panel and comprise at least one conveyor, and which are able to move in a direction,
  a wire intended to cut the plate or panel,
  means of passing the wire in a direction perpendicular to the direction of travel of the plate or panel.

According to another particular feature, the wire is a steel wire of a diameter comprised between 300 μm and 2 mm, particularly between 400 μm and under 1 mm, in particular between 400 μm and 700 μm.

According to another particular feature, the wire at its surface comprises abrasive particles of a size preferably comprised between 30 and 80 μm.

According to another particular feature, the abrasive particles are, in particular, particles of diamond or of zirconium oxide or of boron nitride.

According to another particular feature, the wire is fixed at each of its ends to a reel, the wire being wound on the two reels, which are slaved to one another, the space between the two reels being greater than at least one dimension of the plate or panel that is to be cut.

According to another particular feature, the linear speed at which the wire passes is comprised between 10 m/s and 20 m/s.

According to another particular feature, the tension in the wire is comprised between 150 N and 500 N.

According to another particular feature, the device further comprises holding means that hold the plate or panel, the holding means comprising a suction holding system designed to move simultaneously with and in the same direction as the movement means that move the plate or panel.

According to another particular feature, the device further comprises movement means that move the wire, the wire being able to move both in a direction perpendicular to the direction of travel of the plate or panel and to the direction in which the wire passes.

According to another particular feature, the speed of travel of the plate or panel is between 10 mm/s and 2 m/s, particularly between 500 mm/s and 2 m/s for cutting in the thickness or between 10 mm/s and 2 m/s, in particular between 10 mm/s and 250 mm/s for cutting on the edges.

According to another particular feature, the speed of travel of the wire is between 10 mm/s and 2 m/s, in particular between 10 mm/s and 250 mm/s for cutting on the edges.

According to another particular feature, with the device being installed on the production line that produces the plate or panel of construction material, the speed of travel of the plate or of the panel is at least 1 m/min, preferably at least 2 m/min, it being possible for the cut to be made in the thickness or on the edges.

The invention also proposes a method for cutting plates or panels of porous construction material, comprising the following steps:
  supply of a plate or panel of porous construction material,
  movement of the plate or panel in a direction by movement means that comprise at least one conveyor,
  cutting of the plate or panel by a wire able to pass in a direction perpendicular to the direction of travel of the plate or panel.

According to another particular feature, the cut is made by a steel wire with a diameter of between 300 μm and 2 mm, particularly between 400 μm and under 1 mm, in particular between 400 μm and 700 μm.

According to another particular feature, the wire at its surface comprises abrasive particles, of a size preferably comprised between 30 and 80 μm.

According to another particular feature, the abrasive particles are made of diamond or of zirconium oxide or boron nitride.

According to another particular feature, the wire is wound onto and unwound from two reels which are slaved to one another, the space between the two reels being greater than the dimensions of the plate or of the panel that is to be cut.

According to another particular feature, the wire passes at a linear speed of between 10 m/s and 20 m/s.

According to another particular feature, the tension in the wire is set to a value of between 150 N and 500 N.

According to another particular feature, the plate or panel moves at a speed of between 10 mm/s and 2 m/s, in particular between 500 mm/s and 2 m/s for cutting in the thickness or between 10 mm/s and 2 m/s, in particular between 10 mm/s and 250 mm/s for cutting on the edges.

According to another particular feature, the method further comprises a step in which holding means take hold of the plate or panel, the holding means comprising a suction holding system designed to move simultaneously with and in the same direction as the movement means that move the plate or panel.

According to another particular feature, during the step of cutting the plate or panel, the wire is able to move in a direction perpendicular both to the direction of travel of the plate or panel and to the direction in which the wire passes, so as to make a cut in two mutually perpendicular directions.

According to another particular feature, the wire moves at a speed of between 10 mm/s and 2 m/s, in particular between 10 mm/s and 250 mm/s for cutting on the edges.

According to another particular feature, the cutting step is performed on the production line that produces the plate or panel of construction material, in which the speed of travel of the plate or panel is at least 1 m/min, preferably at least 2 m/min, it being possible for cutting to be performed in the thickness or on the edges.

Other features and advantages of the invention will now be described with reference to the drawings in which.

Reference numbers which are identical in the various figures represent elements that are similar or identical.

The invention relates to a device for cutting a plate or panel of porous construction material, comprising movement means that move the plate or panel and comprise at least one conveyor, and which are able to move in a direction X, a wire designed to cut the plate or panel, and means of passing the wire in a direction Y perpendicular to the direction X of travel of the plate or panel.

The wire allows material loss and waste generated to be limited as far as possible because a wire is far thinner than the saws of the known cutting devices. In addition, cutting using a wire generates practically no dust, making it possible to improve operator working conditions.

Particularly in the case of a rock wool product containing particles of unfiberized material, it has been found that the particulate cutting residue is considerably reduced in quantity and in mass, and that it contains far fewer particles than with conventional cutting, the particles in the main remaining included within the mineral product. It is assumed here that the cutting wire makes itself a path between the fibers, or respectively between the fibers and the particles, and frees the fibers by parting the entanglement of fibers rather than by breaking the fibers. This can be achieved by choosing a wire that is sufficiently thin in comparison with the defects of the fibrous product, typically of a diameter smaller than the size of the unfiberized particles which may measure from 1 to several millimeters in diameter.

What is meant by a "plate or panel" is either a continuous strip or an article of substantially parallelepipedal shape generally resulting from the on-line cutting after curing the binder, and which may even have been cut again offline subsequently. The terms "plate or panel" include plates or panels designed to be rolled up for marketing purposes.

Figure 1:
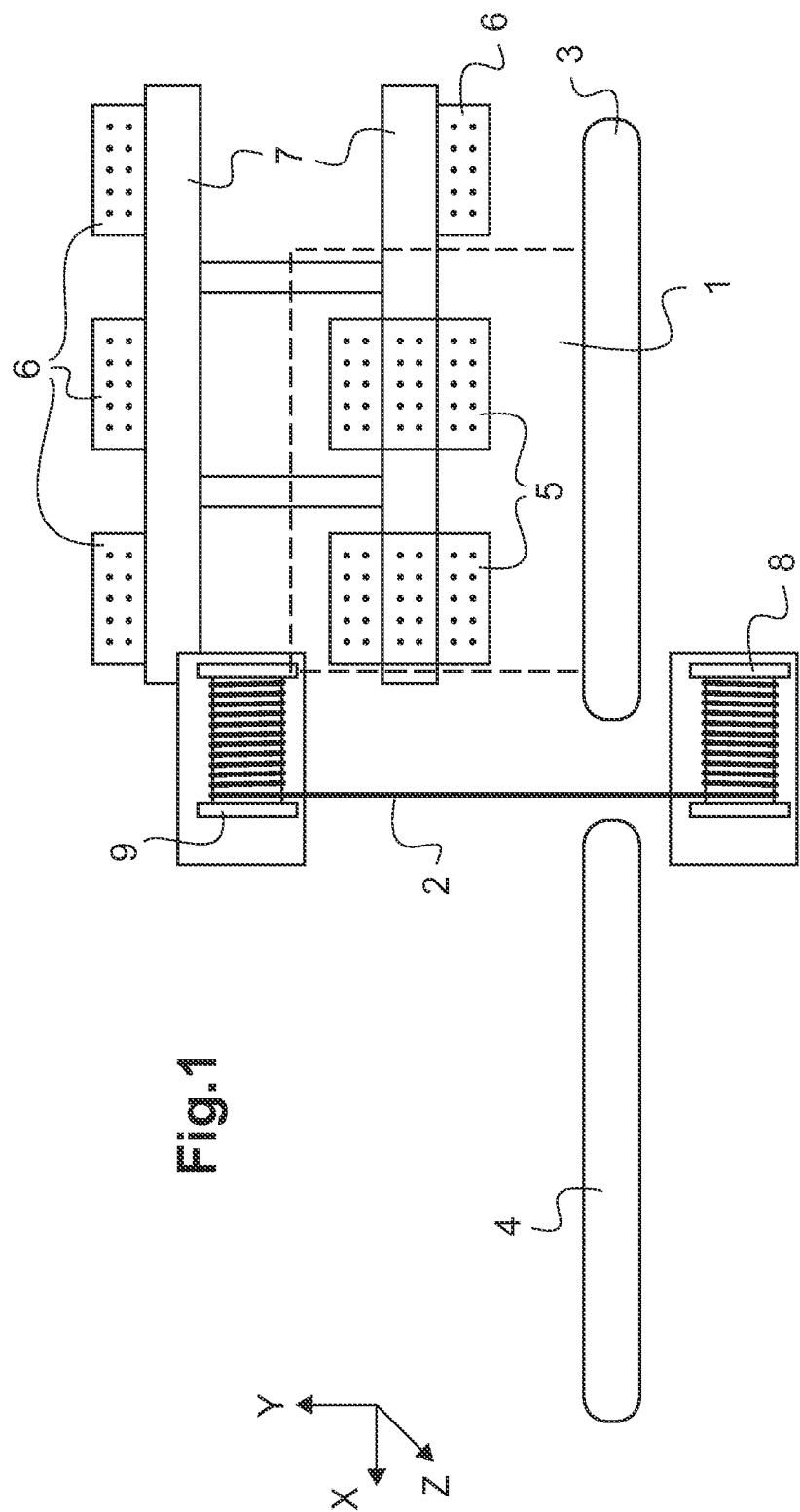
FIG. 1 depicts a face-on view of a cutting device according to the invention.

FIG. 1 depicts a face-on view of the cutting device according to the invention.

The plate or panel 1 of porous construction material which is intended to be cut on the device according to the invention has, for example, a density greater than or equal to 5 $kg/m^3$, particularly at least 10 $kg/m^3$, in particular at least 20 to 25 $kg/m^3$ and preferably less than 180 $kg/m^3$.

The cutting device according to the invention comprises movement means that move a plate or panel 1 of porous construction material in a direction X, as well as a wire 2 designed to cut the plate or panel 1. The cutting device according to the invention also comprises means 8, 9 causing the wire 2 to pass in a direction Y perpendicular to the direction X of travel of the plate or panel 1. Here, the means 8, 9 causing the wire to pass are reels. Alternatively, the wire may pass in the direction Y in a back-and-forth or reciprocating movement.

Depending on the embodiment, the wire may be fixed with respect to the direction Z or able to move in this direction Z, the direction Z being perpendicular both to the direction X of travel of the plate or panel 1 and to the direction Y in which the wire 2 passes.

The movement means that move the plate or panel 1 comprise at least one conveyor 3, 4. The conveyor 3, 4 is a horizontal belt conveyor on which the plate or panel 1 rests. The conveyor may advance forward or move back according to the requirements of the cutting. The direction of travel is the axis X in FIG. 1. The plate or panel 1 may rest horizontally, laid flat, or vertically, laid edge-on on the conveyor 3, 4.

The conveyor 3, 4 is preferably in two parts when the wire 2 is able to move in the direction Z. Thus, a space is left between the two conveyor parts 3, 4 to allow the wire 2 to pass for the transverse cutting of the plate or panel 1 without being impeded by the conveyor.

When the plate or panel 1 is in the form of a continuous horizontal strip, the wire 2 may allow on-line cutting, for example into two in the thickness. The wire 2 is then fixed and the plate or panel rests horizontally on the conveyor.

When the plate or panel 1 is in the form of a continuous horizontal strip, the wire 2 may also allow on-line transverse cutting, for example to form plates or panels of substantially parallelepipedal shape. The wire 2 is then able to move in the direction Z.

When the plate or panel 1 rests vertically on the horizontal conveyor 3, 4, the wire 2 may be fixed with respect to the axis Z or able to move in the direction Z.

Depending on the embodiment, the cutting device according to the invention may therefore comprise means of moving the wire 2 in the direction Z, these movement means allowing the wire 2 to be moved in a direction Z perpendicular both to the direction X of travel of the plate or panel 1 and to the direction Y in which the wire 2 passes. Thus, the device allows cuts to be made in two mutually perpendicular directions. In that way, several different cuts can be made in a single pass. In addition, by combining the two movements in the directions X and Y, cuts of varying shapes may be made.

Moreover, when the plate or panel 1 rests vertically on the horizontal conveyor, the device comprises holding means 5, 6, 7 that hold the plate or panel 1 so as to hold the plate or panel in position. In such a case, the holding means 5, 6, 7 that hold the plate or panel 1 are able to move simultaneously with and in the same direction X as the conveyor 3, 4 for a uniform movement of the plate or panel 1.

The holding means that hold the plate or panel 1 comprise a suction holding system 5, 6, 7. The suction holding system 5, 6, 7 is made up of suction grippers 5, 6 fixed to a mobile support 7 designed to move at the same time as the conveyor or conveyors 3, 4 while the plate or panel 1 is being cut. The suction grippers 5, 6 may take the form of plates pierced with a multitude of orifices which are connected to a depressurization means; the diameter of the orifices is chosen according to the force that is to be applied locally to the plate or panel 1. The grippers 5, 6 may have different sizes, as depicted in FIG. 1. The plate or panel 1 needs to be perfectly held by the suction grippers 5, 6 while the wire 2 is cutting so as to allow the cut to be as precise as possible. Larger-sized grippers 5 allow a firmer hold of small-sized plates or panels. The suction grippers 5, 6 need to allow the plate 1 to be held without stressing or deforming it. These suction grippers react the load supplied by the wire as the plate or panel 1 and/or the wire 2 move, so as to ensure perfect control over the dynamic positioning of the plate or panel and so as to prevent any slippage of the plate or panel with respect to the gripper. The various movements are synchronized through a numerical control system. In FIG. 1, only the suction grippers 5 are holding the plate or panel 1, because in this exemplary embodiment, the plate or panel is small in size. The peripheral suction grippers 6 are used to supplement the suction grippers 5 for plates or panels 1 of larger size.

The wire 2 is preferably a steel wire of a diameter comprised between 300 μm and 2 mm, particularly between 400 μm and under 1 mm, in particular between 400 μm and 700 μm, preferably between 420 μm and 550 μm in order to improve the quality of the cut, or even between 480 μm and 520 μm in order to improve still further the quality of the cut. The steel wire may at its surface comprise abrasive particles which are, for example, made of diamond, of zirconium oxide or of boron nitride. The size of the abrasive particles is preferably comprised between 30 and 80 μm. The space between the abrasive particles is preferably comprised between 10 μm and 20 μm. The presence of abrasive particles makes it possible to achieve a clean cut, making it possible to dispense with the need for subsequent sanding.

Figure 2:
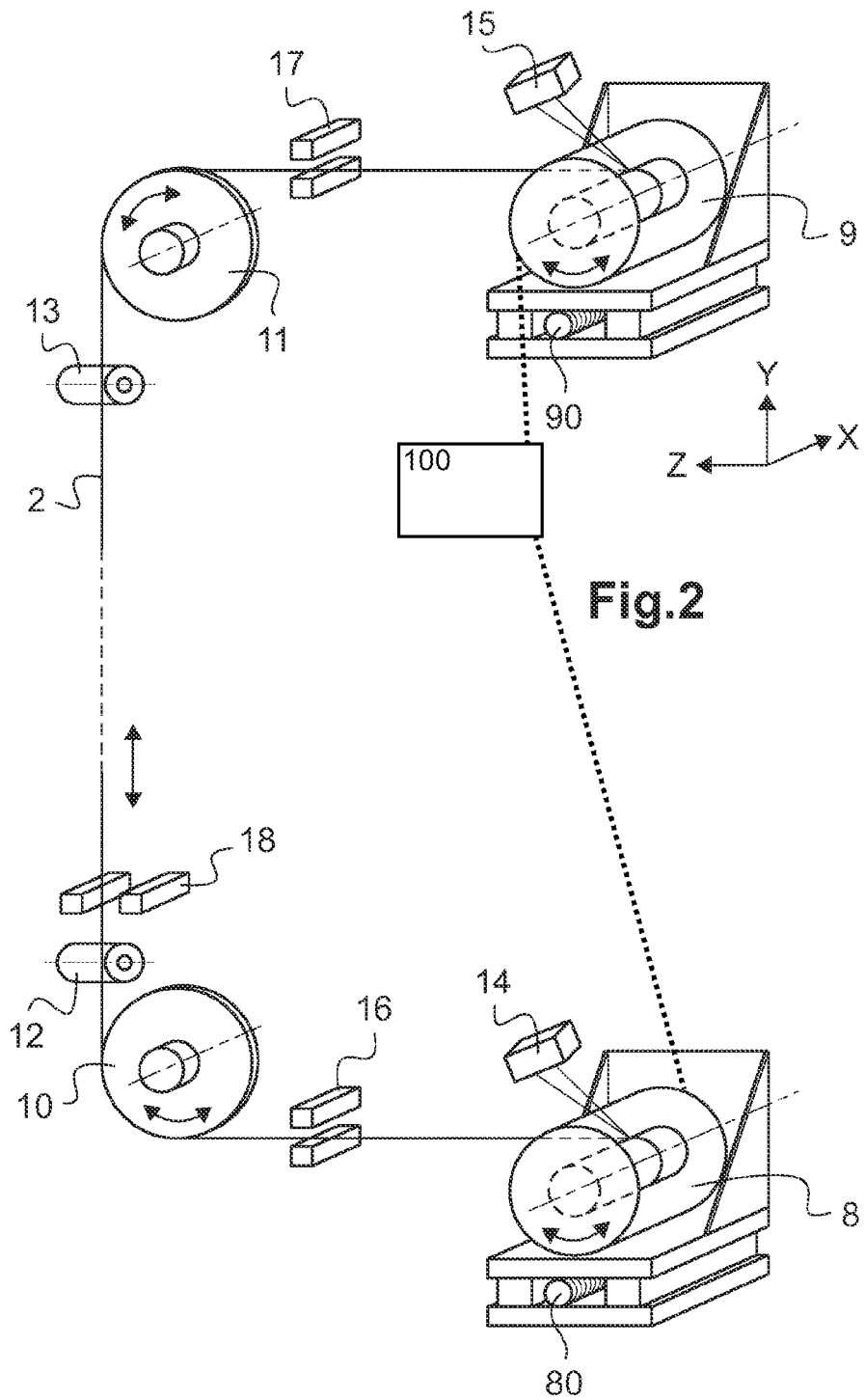
FIG. 2 depicts a detailed side view of the cutting device according to the invention.

According to one embodiment of the invention, the wire 2 is fixed at each of its ends to a reel 8, 9. The wire 2 is wound on the two reels 8, 9, the space between the two reels 8, 9 being greater than at least one dimension of the plate or panel 1 that is to be cut. The wire 2 is preferably vertical (along the axis Y), as depicted in FIGS. 1 and 2. Each of the lower 8 and upper 9 reels is rotationally driven by a motor (not depicted). The reels 8, 9 are slaved to one another by a servo control system 100 to make it possible to maintain a constant wire tension and to keep control over the speed at which the wire 2 passes. This servo control system 100 is described in greater detail later on in the text. The wire 2 has a length of, for example, between 5 and 15 km. It is unwound from one reel to wind onto the other reel. When one reel 8, 9 is empty and the other is full, the direction in which the wire 2 passes is reversed so that the wire winds onto the empty reel and unwinds from the full reel.

FIG. 2 depicts a detailed side view of the cutting device according to the invention.

The wire 2 is guided, as it leaves each of the reels 8, 9, by a guide pulley 10, 11 respectively, which positions the wire 2 with respect to the plate or panel 1 that is to be cut. On leaving each of the guide pulleys 10, 11, the wire is further guided by a respective roller 12, 13 which allows the wire to be positioned even more precisely still. Thus, when the wire 2 is in the vertical position (along the axis Y) as in FIGS. 1 and 2, the wire 2 passes for example over the lower reel 8, then over the lower guide pulley 10 then over the lower roller 12 then over the upper roller 13 then over the upper guide pulley 11 then onto the upper reel 9. When it is being cut by the wire 2, the plate 1 passes between the two rollers 12, 13.

The linear speed at which the wire 2 passes is comprised between 10 m/s and 20 m/s, preferably between 14 m/s and 16 m/s or is even equal to 15 m/s, to improve still further the quality of the cut. The wire 2 passes dry, without passing through a cooling liquid.

The tension in the wire 2 is comprised between 150 N and 500 N, preferably between 250 N and 350 N in order to improve still further the quality of the cut. The tension in the diamond-gritted wire is dependent on the diameter of the wire. The more taut the wire is, the more its bending is reduced. Because the wire 2 may be subjected to very high stresses, it is preferably made of high tensile steel capable of withstanding tensile stresses of as much as 1000 MPa, or even 2000 MPa.

The diameter, linear speed and tension of the wire 2 are three parameters that are very important to the clean cutting of the plate. Hence, the cutting device according to the invention comprises several sensors connected to the servo control system 100 which allow the servo control system 100 to adapt the rotational speed of the reels 8, 9 in real time (every 5 ins) in order to keep the linear speed and tension constant during cutting.

Thus, the cutting device comprises, facing each reel 8, 9, a respective optical sensor 14, 15 which measures the diameter of the reel (or, more precisely, the outside diameter of the winding of wire on the reel): as explained earlier, the diameter of the reel varies during cutting as the wire gradually unwinds from one reel to be wound onto the other reel. This variation in diameter is taken into consideration in real time to adjust the winding/unwinding speed of the reels 8, 9, and guarantee the desired linear speed. The data from these optical sensors 14, 15 also make it possible to evaluate how much length of wire remains on each of the reels.

The cutting device also comprises two position measuring sensors 16, 17 positioned respectively between the lower reel 8 and the lower guide pulley 10, and between the upper reel 9 and the upper guide pulley 11. These sensors 16 and 17 measure the position and the bending of the wire 2 along the axis X. Each of the reels 8, 9 is mounted on an endless screw 80, 90 respectively, the axis of which is parallel to the direction X, so as to allow real-time alignment between the position of the wire 2 winding onto/unwinding from the reels 8, 9 and the position of the guide pulleys 10, 11 along the axis X. The sensors 16, 17 make it possible to regulate this reeling function.

The cutting device also comprises a bending-measurement sensor 18 positioned between the rollers 12, 13. This bending-measurement sensor 18 makes it possible to measure the deformation of the wire along the axis X, as imposed by the thrust applied by the product in its relative movement with respect to the wire. The data from this bending-measurement sensor 18, coupled with the data from the optical sensors 14, 15, make it possible to adjust the wire tension in real time by adjusting the speed of winding/unwinding of the reels 8, 9. This bending sensor 18 thus allows the straightness of the wire to be regulated.

The position and bending measurement sensors 16 to 18 are, for example, digital arrays provided with a plurality of laser beams which detect the path of the wire.

By virtue of these sensors 14 to 18 which are means of very precisely controlling the tension of the wire, the amplitude of vibration of the wire can thus be minimized so that no ripple can now be perceived through a visual inspection of the cut face, giving a near-perfect appearance. The wire tension, which is adjusted to avoid vibrations, means that the wire behaves more like a wedge driving a crack through the material than like a knife cutting the fibers in two.

Finally, the assembly formed by the wire 2, the reels 8, 9, the guide pulleys 10, 11, the rollers 12, 13 and the sensors 14 to 18 is mounted on a chassis or an upright (not depicted), itself associated with movement means (not depicted). These movement means allow the wire 2 to be moved in the direction Z of FIG. 1, namely along an axis that is perpendicular both to the direction of travel of the plate or panel 1, which is along the axis X, and to the direction Y in which the wire 2 passes. The two movements along the axes X and Z may be combined to make cuts of complex shape. The speed of travel of the wire 2 along the axis Z is comprised between 10 mm/s and 2 m/s, particularly between 10 mm/s and 250 mm/s for cutting on the edges in order to allow precision in the geometric pattern at the edges.

The cutting device according to the invention allows a plate or panel 1 to be cut:
 in its width or its length in order to obtain a plate or panel of smaller size,
 in its thickness in order to obtain at least two plates or panels of a thickness smaller than that of the starting plate or panel, and/or
 on its edges so as to create a rabbet or any other form of edge detail.

During cutting, the speed at which the plate or panel 1 travels is comprised between 500 mm/s and 2 m/s for cutting in the thickness, of the splitting type, and between 10 mm/s and 2 m/s, particularly between 10 mm/s and 250 mm/s for cutting on the edges in order to allow precision in the geometric pattern of the edges. The plate or panel 1 moves through the combined movement of the conveyors 3, 4 and of the suction holding system 5, 6, 7.

The edge cuts or rabbets may have any conceivable shapes, with geometries as varied as square, rectangular, triangular, polygonal, rounded, curved, sinusoidal, etc.

The movements of the plate or panel, the movements of the wire, the winding/unwinding speeds of the reels, the movements of the endless screws and the actuation of the suction grippers are motorized and controlled by an overall control system of the device.

The cutting device according to the invention makes it possible for example to create mineral wool acoustic panels for ceilings. The rabbets made on each of the edges of such acoustic panels are intended to rest on a metal framework fixed to the ceiling. Such panels are generally square in shape but may also be rectangular. When the plate or panel is cut into two in the thickness from a plate or panel covered with a film on its two main faces, the resulting panel generally has a film on just one of its main faces. A film may therefore be bonded to the other main face of the panel resulting from the cut.

Figure 3:
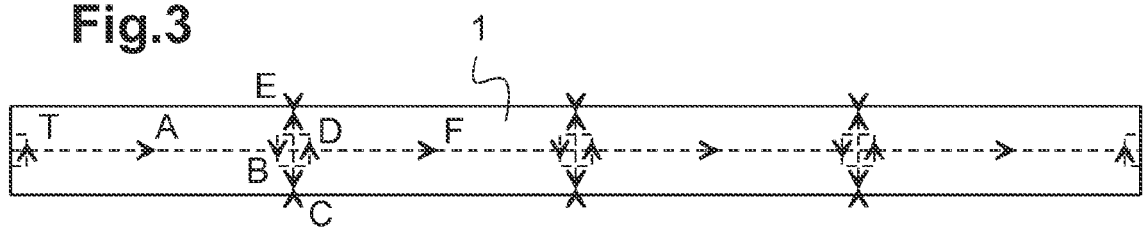
FIG. 3 depicts a view in cross section of an example of cutting into a plate or panel, performed with the device according to the invention.

The cutting device according to the invention makes it possible for example to cut a plate or panel at once in its thickness, transversely across its width, and on its edges to create rabbets or any other edge detail, as shown in FIG. 3 for example.

FIG. 3 depicts a view in cross section of one example of a cut in a plate or panel, made using the device according to the invention, following a path defined by the succession of portions identified by the capital letters.

Thus, the plate or panel may be cut on one of its edges to create a rabbet (reference T), then into two in its thickness (reference A) then transversely across its width with simultaneous cutting of rabbets (references B, C, D, E), then cut into two again in the thickness (reference F) and so on so as to form several plates or panels with rabbets cut on two opposite edges. Each plate or panel obtained is then rotated through 90° so as to make a transverse cut in the direction of the initial length with simultaneous cutting of rabbets on the two remaining edges. The rotation through 90° may be performed by means of a system of suction grippers similar to the grippers 5, 6, positioned facing the grippers 5, 6. As an alternative, the cut panels may be conveyed to another cutting station equipped with another wire designed to cut rabbets on the remaining edges.

It is also possible to cut the plate or panel to the correct size first of all and then cut the rabbets.

This then yields one or more plates or panels, for example square or rectangular ones, with rabbets on each of their edges.

The invention also relates to a method of cutting implementing the cutting device according to the invention.

Thus, the method for cutting a plate or panel made of porous construction material comprises the following steps:
 supply of a plate or panel 1 of porous construction material,
 movement of the plate or panel 1 in a direction X by movement means 3, 4 which comprise at least one conveyor,
 cutting of the plate or panel by a wire 2 able to pass in a direction Y perpendicular to the direction X of travel of the plate or panel 1.

During cutting, the plate or panel 1 is moved by virtue of the conveyor 3, 4. It may be held by virtue of the suction holding system 5, 6, 7. The wire 2 may be able to move in a direction perpendicular both to the direction X of travel of the plate or panel 1 and to the direction Y in which the wire passes.

The method of cutting may be performed on-line, at the end of the production line that produces the plate or panel 1. In such a case, the cutting device is installed on-line. The speed of travel of the plate or panel 1 is at least 1 or 2 m/min, preferably at least 15 m/min, or even at least 30 m/min, it being possible for cutting to be performed in the thickness or on the edges.

The invention claimed is:

1. A device for cutting a plate or panel of porous construction material, comprising:
 a conveyor configured to move the plate or panel in a first direction;
 a wire intended to cut the plate or panel; and
 a first reel and a second reel on which the wire is wound so as to pass the wire in a second direction perpendicular to the first direction, the first and second reels being slaved to each other by a servo control system, wherein the servo control system is configured to adapt a rotational speed of the first and second reels in real time to keep a linear speed and a tension of the wire constant during cutting, the servo control system being connected to optical sensors which measure a diameter of the first and second reels, position sensors which measure a position and a bending of the wire along the first direction, and a bending-measurement sensor which measures deformation of the wire along the first direction.

2. The cutting device as claimed in claim 1, wherein the wire includes a steel wire of a diameter comprised between 300 μm and 2 mm.

3. The cutting device as claimed in claim 2, wherein a surface of the steel wire comprises abrasive particles of a size comprised between 30 and 80 μm.

4. The cutting device as claimed in claim 3, wherein the abrasive particles are particles of diamond or of zirconium oxide or of boron nitride.

5. The cutting device as claimed in claim 1, wherein the linear speed at which the wire passes is comprised between 10 m/s and 20 m/s.

6. The cutting device as claimed in claim 1, wherein the tension in the wire is comprised between 150 N and 500 N.

7. The cutting device as claimed in claim 1, further comprising a vacuum holding system that is movable simultaneously with the conveyor and in the first direction.

8. The cutting device as claimed in claim 1, wherein the conveyor is configured to move the plate or panel at a speed of travel between 10 mm/s and 2 m/s.

9. The cutting device as claimed in claim 1, further comprising first and second guide pulleys and first and second rollers, the wire extending along the first direction between the first reel and the first guide pulley and between the second reel and the second guide pulley, the wire extending in the second direction between the first guide pulley and the first roller, between the first roller and the second roller, and between the second roller and the second guide pulley, and the bending-measurement sensor being disposed between the first roller and the second roller.

10. A method for cutting a plate or panel of porous construction material, comprising:
supplying a plate or panel of porous construction material;
moving the plate or panel in a first direction by a conveyor;
cutting the plate or panel by a wire wound on a first reel and a second reel so as to pass in a second direction perpendicular to the first direction, the first and second reels being slaved to each other by a servo control system; and
adapting a rotational speed of the first and second reels in real time to keep a linear speed and a tension of the wire constant during the cutting by the servo control system connected to optical sensors which measure a diameter of the first and second reels, position sensors which measure a position and a bending of the wire along the first direction, and a bending-measurement sensor which measures deformation of the wire along the first direction.

11. The method of cutting as claimed in claim 10, wherein the wire includes a steel wire with a diameter of between 400 μm and 2 mm.

12. The method of cutting as claimed in claim 11, wherein a surface of the steel wire comprises abrasive particles of a size comprised between 30 and 80 μm.

13. The method of cutting as claimed in claim 12, wherein the abrasive particles are made of diamond or of zirconium oxide or boron nitride.

14. The method of cutting as claimed in claim 10, wherein the linear speed of the wire is between 10 m/s and 20 m/s.

15. The method of cutting as claimed in claim 10, wherein the tension in the wire is set to a value of between 150 N and 500 N.

16. The method of cutting as claimed in claim 10, wherein the plate or panel moves at a speed of between 10 mm/s and 2 m/s for cutting in a thickness of the plate or panel, or between 10 mm/s and 2 m/s for cutting on edges of the plate or panel.

17. The method of cutting as claimed in claim 10, further comprising holding the plate or panel via a vacuum holding system that is movable simultaneously with the conveyor and in the first direction.

18. The method of cutting as claimed in claim 10, wherein, during the cutting the plate or panel, the wire is able to move in a third direction perpendicular to both the first direction and the second direction, so as to make a cut in two mutually perpendicular directions.

19. The method of cutting as claimed in claim 18, wherein the wire moves at a speed of between 10 mm/s and 2 m/s for cutting on edges of the plate or panel.

20. The method of cutting as claimed in claim 10, further comprising providing first and second guide pulleys and first and second rollers, the wire extending along the first direction between the first reel and the first guide pulley and between the second reel and the second guide pulley, the wire extending in the second direction between the first guide pulley and the first roller, between the first roller and the second roller, and between the second roller and the second guide pulley, and the bending-measurement sensor being disposed between the first roller and the second roller.

* * * * *